May 20, 1924.
T. J. KENNEDY
TRACTOR GRIP FOR TRUCKS, ETC
Filed Dec. 22, 1922
1,494,689
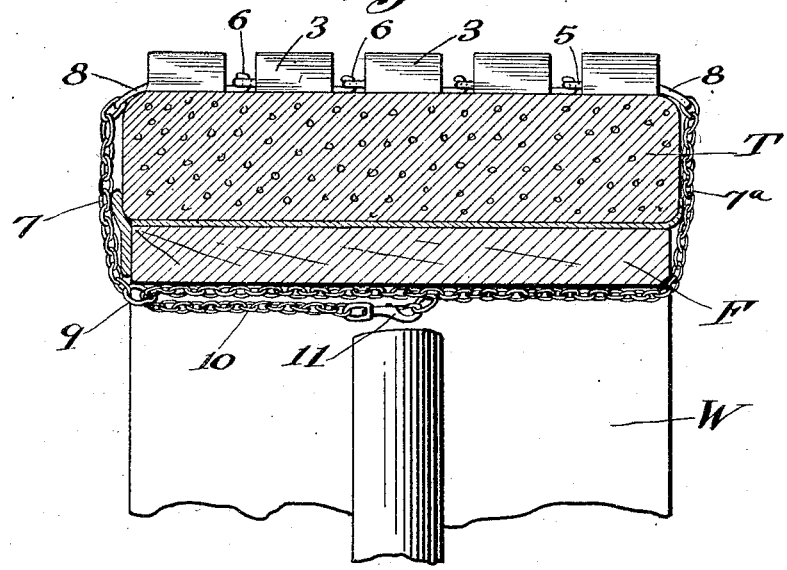
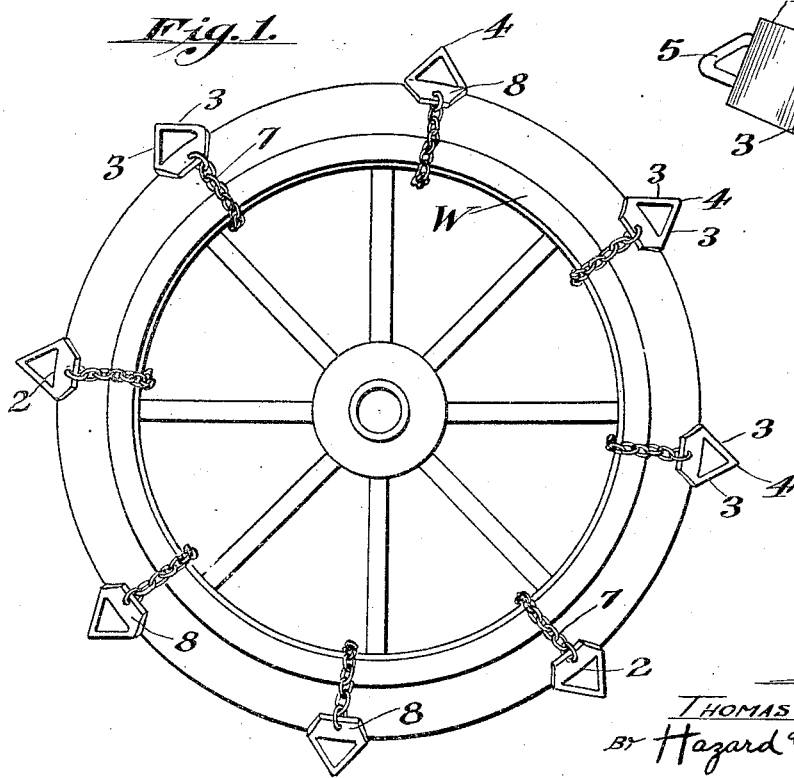
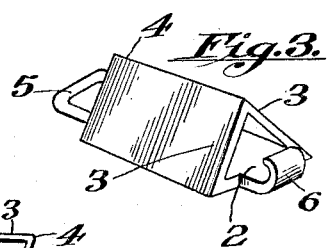
Inventor
THOMAS J. KENNEDY.
By Hazard and Miller
Attorneys Patented May 20, 1924.

1,494,689

UNITED STATES PATENT OFFICE.

THOMAS J. KENNEDY, OF SAN BERNARDINO, CALIFORNIA.

TRACTOR GRIP FOR TRUCKS, ETC.

Application filed December 22, 1922. Serial No. 608,449.

*To all whom it may concern:*

Be it known that I, THOMAS J. KENNEDY, a citizen of the United States, residing at San Bernardino, in the county of San Bernardino and State of California, have invented new and useful Improvements in Tractor Grips for Trucks, Etc., of which the following is a specification.

This invention relates to tractor grips for trucks and other vehicles, and has for its object to provide an extremely simple, inexpensive, durable and easily applied and removed traction increasing device for vehicle wheels.

Other objects and advantages will be made manifest in the following specification of an embodiment of the invention illustrated in the accompanying drawings, wherein—

Figure 1 is a side elevation of a wheel showing devices applied.

Fig. 2 is a cross section of the felly and tire of a form of wheel showing the device applied.

Fig. 3 is a perspective of one of the traction shoes.

The invention is shown as incorporating a plurality of relatively flexibly connected gripping or shoe devices which are adapted to be transversely laid across the tire T on the felly F of a wheel W. The traction devices or shoes are preferably of triangular cross section and of suitable length. The type of the shoe shown in Fig. 3 has a generally flat base or bottom web 2 with upwardly convergent opposite walls 3—3 which meet in a longitudinally extending penetrating or traction corner 4. Thus the shoe is shown as hollow, although it is to be understood that it may be solid if desired.

One end of the shoe is provided with an eye or loop 5, while the opposite end is provided with a hook 6 so that a series of the shoes is adapted to be fixedly locked together in chain-like manner. A series of the links, therefore, forms a transverse gripping device when applied to the face of the tire T. Means are provided for securely fastening an applied gripper or series of the shoes, and such means includes sections of chain 7 and 7ª. The end shoes of the series are preferably provided with downwardly struck tongues 8 perforated to receive connecting links of the chain sections. One of the chain sections is provided with a slip ring 9 and through this is adapted to be drawn a bight 10 of the other chain section, this bight having a simple snap hook 11 at its free end so that the bight can be drawn up tight and thus pull the chain sections 7 and 7ª snugly against the tire and felly after which the bight may be fastened by the passage of the hook 11 through one of the contiguous links of the chain crossing under the felly.

From the above it will be seen that the gripper is of simple and substantial construction and of inexpensive character and may be readily applied and readily removed, and will materially increase the tractive efficiency of a wheel to which a set of the grippers may be applied.

Further embodiments, modifications and changes may be resorted to within the spirit of the invention as here claimed.

What is claimed is:

1. A traction gripping device for a vehicle wheel, comprising a series of flexibly connected traction shoes, one of the end shoes of the series being provided with a chain having an eye, the other end shoe of the series having a chain with a loop threading said eye which is adapted to be drawn tight and fastened.

2. A traction chain link member forming a shoe of triangular cross section and presenting a longitudinal straight traction ridge.

3. In a traction gripper for a vehicle wheel, a traction shoe having a triangular cross section, and one end of the shoe being provided with an eye and the other end with a hook whereby contiguous ends of a series of the shoes may be interhooked together.

4. A hollow traction chain link member of triangular cross section presenting a longitudinal straight traction ridge.

In testimony whereof I have signed my name to this specification.

THOMAS J. KENNEDY.